United States Patent [19]
Duthion et al.

[11] 3,708,036
[45] Jan. 2, 1973

[54] APPARATUS FOR ATTENUATING THE NOISE MADE BY FLUID JETS EJECTED FROM A CONDUIT

[75] Inventors: Louis Duthion, Paris; Andre Emile Roger Cabassut, Versailles; Andre Julien Labussiere, Fontenay-le-Fleury, all of France

[73] Assignees: BERTIN & Cie, Plaiser, Yvelines; Avions Marcel Dassault, Vaucresson, Hauts de Seine, France

[22] Filed: May 11, 1971

[21] Appl. No.: 142,155

[30] Foreign Application Priority Data

May 11, 1970 France..............................7016980

[52] U.S. Cl.......181/33 H, 181/33 HD, 239/265.13, 239/265.15
[51] Int. Cl..........F01n 1/08, F01n 1/16, B64d 33/06
[58] Field of Search..........181/33 H, 33 HA, 33 HB, 33 HC, 181/36 C, 33 HD, 69, 46, 56, 38; 239/265.11, 265.15, 265.13, 265.33, 265.37

[56] References Cited

UNITED STATES PATENTS

| | | | |
|---|---|---|---|
| 1,287,458 | 12/1918 | Schrack.................................181/38 |
| 2,692,024 | 10/1954 | Burdett et al.....................181/33 HC |
| 3,011,584 | 12/1961 | Lemmerman et al............181/33 HC |
| 2,956,637 | 10/1960 | Lemmerman.....................181/33 HC |
| 3,120,877 | 2/1964 | Morris et al................. 81/33 HC |
| 3,153,319 | 10/1964 | Young et al................181/33 HD |
| 3,159,238 | 12/1964 | Shearer............................181/33 HB |
| 3,165,167 | 1/1965 | Miller et al........................181/33 HC |
| 3,174,581 | 3/1965 | Duthion et al. ..................181/33 HC |
| 3,512,717 | 5/1970 | Hope-Gill........................239/265.37 |

OTHER PUBLICATIONS

NACA Technical Note 3452, pp. 1–14 and Front Cover, published May 1955.
NACA Technical Note 4033, pp. 1–9, 12–16 and Front Cover, published July 1957.

*Primary Examiner*—Robert S. Ward, Jr.
*Attorney*—Watson, Cole, Grindle & Watson

[57] ABSTRACT

An openwork screen is placed in the discharge plane of a conduit discharging a jet of fluid at sonic speeds, to reduce the noise. The screen can be in the form of parallel slats, radial slats or a network of slats. In the case of aircraft jets the screen is preferably removable form the discharge plane of the jet outlet conduit. To do this the screen can be constructed so that it disintegrates after a predetermined length of time or can be destroyed by explosives or other such means when required. Alternatively, the screen can be pivotally mounted on the wing so that it can be swung by hydraulic means into the discharge plane of the jet or out of the way, it can be arranged as a blind which can be drawn over the jet outlet, or it can be in the form of elements pivotally attached at one end to the conduit around its circumference and releasably connected near the center of the conduit so that the elements normally form a screen of radial slats, but when their center connection is released they splay out behind the jet.

9 Claims, 12 Drawing Figures

PATENTED JAN 2 1973          3,708,036
SHEET 1 OF 2
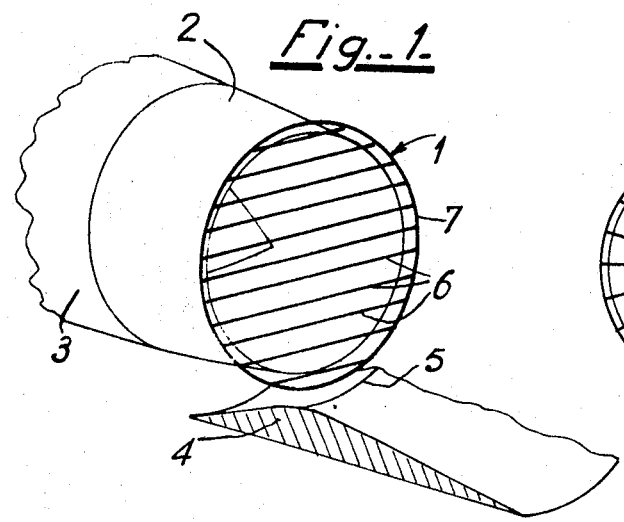
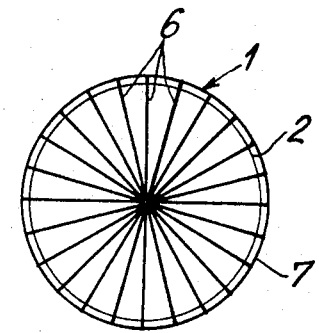
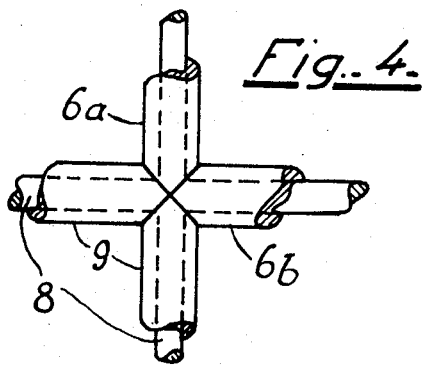
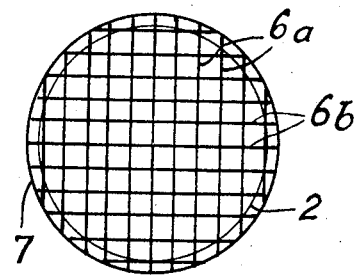
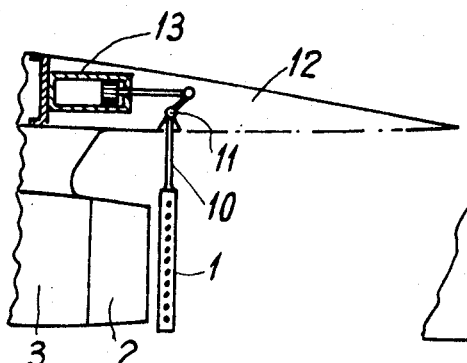
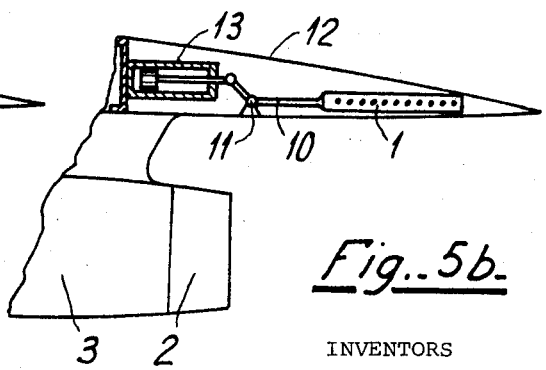
INVENTORS
LOUIS DUTHION
ANDRE' EMILE ROGER CABASSUT
ANDRE' JULIEN LABUSSIERE
BY
WATSON COLE GRINDLE & WATSON
                           ATTORNEYS PATENTED JAN 2 1973 3,708,036
SHEET 2 OF 2
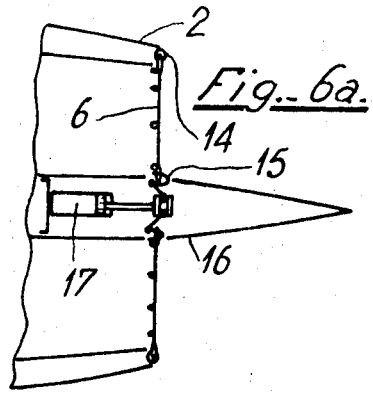
Fig. 6a.
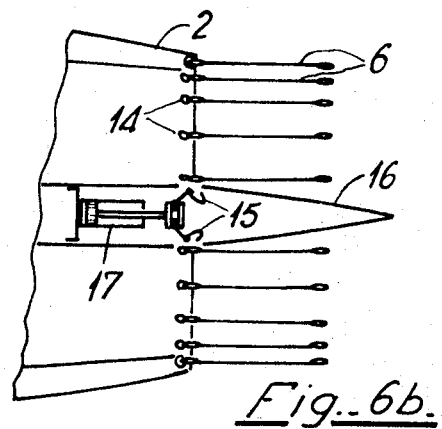
Fig. 6b.
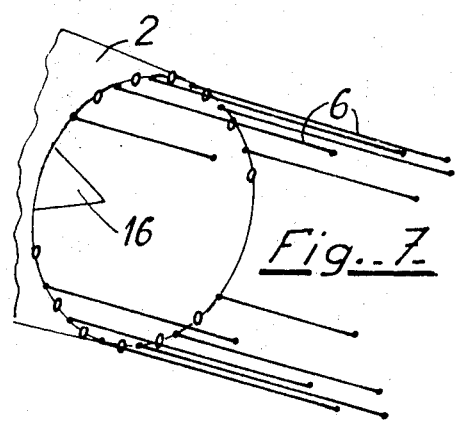
Fig. 7.
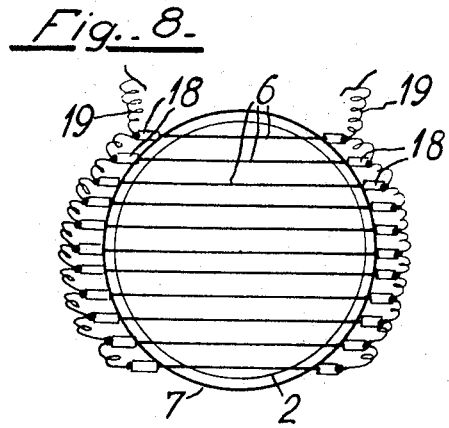
Fig. 8.
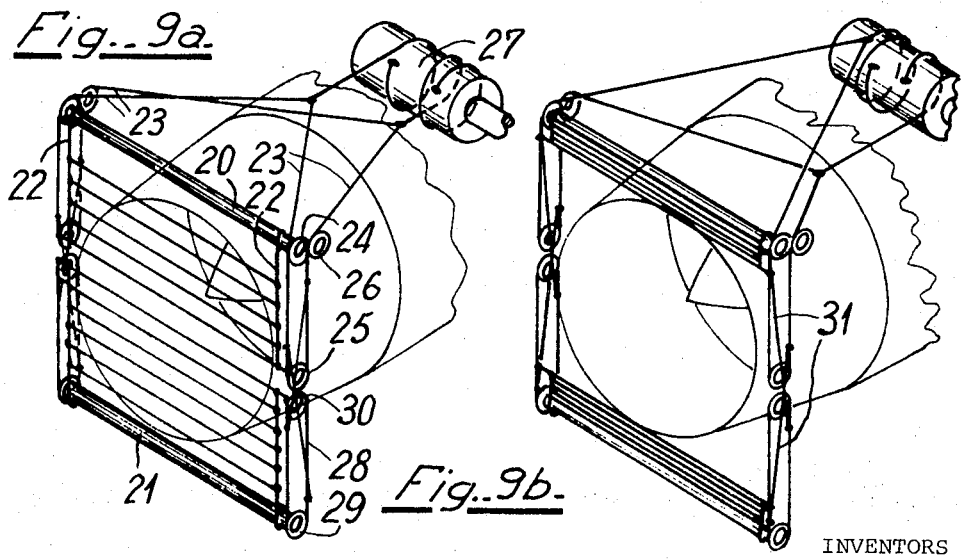
Fig. 9a.
Fig. 9b.
INVENTORS
LOUIS DUTHION
ANDRÉ EMILE ROGER CABASSUT
ANDRÉ JULIEN LABUSSIERE
BY
WATSON COLE GRINDLE & WATSON
ATTORNEYS 3,708,036

APPARATUS FOR ATTENUATING THE NOISE MADE BY FLUID JETS EJECTED FROM A CONDUIT

The invention relates to apparatus for attenuating the noise made by fluid jets ejected from a conduit.

An openwork screen, for instance a grid, disposed at a distance of about half the diameter of the sonic discharge of a high-speed fluid escape conduit of course considerably reduces the noise by destroying the kinetic energy of the jet. This method has been used to attenuate, for instance, the noise of aircraft jets, mainly on the ground, since the noise is reduced with a loss of thrust which would impede taking-off.

We have found that we can obviate this disadvantage by disposing the openwork screen in the discharge plane of the escape conduit, for instance, of an aircraft jet, thus reducing the loss of thrust compared with thrust lost if the screen were disposed forward of the sonic neck in known manner.

Advantageously the openwork screen is made up of wires forming a grid and disposed in the same plane, the section of the escape conduit being reduced by the section of the wires, so that the sonic neck is formed in the plane of the maximum cross-section of the wires.

Such an apparatus attenuates the noise by rapidly mixing the ejection gases with the ambient air. It increases turbulence, thus shortening the length of the mixture, but with a thrust loss less than that caused by a grid disposed downstream of the sonic neck, since by disposing the wires in the sonic plane, shock-waves are eliminated.

Apparatus according to the invention is particularly suitable for high expansion rate jets; results of tests indicate that the best results, namely minimum thrust loss and maximum attenuation of noise, are obtained with an expansion rate of three.

Knots or braiding are preferably avoided in making the grid.

Preferably, the ratio of the open area of the screen to the cross sectional area of the screen is approximately 80–95 percent. Below 80 percent, thrust loss is too high, since too great an obstacle is offered to the jet. Above 95 percent the noise is not sufficiently attenuated.

However, losses of thrust are partly compensated by the increase in thrust produced by the reduction in section due to the presence of the open-work screen in the conduit discharge plane, at the cost of an increase in temperature (although this overload is acceptable for taking-off).

The apparatus according to the invention is preferably retractable or even arranged to be discarded during flight.

Apart from the satisfactory technical results which it achieves (acceptable thrust losses, attenuation of noise) its advantages are its simplicity and therefore low cost, the fact that it can be rapidly put into effect, and its lightness.

Some forms of apparatus for attenuating noise according to the invention will now be described, by way of example, with reference to the accompanying drawings, wherein:

FIG. 1 is a diagrammatic perspective view of the rear of an escape conduit having an openwork screen with parallel wires according to the invention;

FIG. 2 is an elevation of a screen with radial wires;

FIG. 3 is a view similar to FIG. 2 of a screen with crossed wires;

FIG. 4 is a partial view, to an enlarged scale, illustrating the use of wires consumable during operation;

FIGS. 5a and 5b diagrammatically illustrate an apparatus which can be retracted by a jack into the wing of an aircraft;

FIGS. 6a and 6b similarly illustrate an apparatus whose wires are directly articulated to the conduit;

FIG. 7 is a perspective view showing the apparatus illustrated in FIGS. 6a and 6b in the cruising flight position;

FIG. 8 is a front view of an apparatus having wires which can be jettisoned during flight, and FIGS. 9a and 9b are perspective views of an apparatus whose screen is constructed after the fashion of blinds.

In the embodiment illustrated in FIG. 1 an openwork screen 1 is disposed substantially in the discharge plane of the escape conduit 2 of an air craft jet engine 3.

The conduit 2 engages in a convergent-divergent sleeve 4 whose neck 5 is also disposed in the aforementioned discharge plane.

The openwork screen (FIG. 1) is formed by parallel wires 6 attached by their ends to a circular ring 7 whose diameter is slightly larger than that of the discharge orifice of the conduit 2. The screen is disposed coaxially of the conduit, so that the whole of the jet discharge must pass through the screen.

The wires 6 are equidistant from one another which is preferred.

In the example of FIG. 2, the wires 6 forming the openwork screen 1 disposed in the discharge plane of the conduit 2 are radially attached to a circular ring 7.

In the variant illustrated in FIG. 3, the screen 1 comprises two families of parallel and preferably equidistant wires 6a, 6b intersecting one another at right-angles. When the screen is made, the formation of knots is avoided so that all the wires are disposed in the same plane, which is brought into coincidence with the discharge plane of the conduit 2.

The wires 6a, 6b then intersect as illustrated in FIG. 4 which shows composite wires comprising a core 8 and a sheath 9.

The core can be made of a material such as carbon or boron which can be destroyed, for instance sublimated or burnt up, after a predetermined time of contact with the hot gases leaving the escape conduit, the sheath being made of a synthetic resin so as to give the screen satisfactory mechanical strength and protect it until it is to come into operation. The resin then burns, whereafter the wires are destroyed.

The openwork screen can therefore be destroyed, for instance, after the aircraft having the engine has taken off, so that the screen can no longer impede the discharge of gases during cruising flight.

The same result is obtained by the apparatus illustrated in FIGS. 5a and 5b.

The screen 1 is borne by an arm 10 articulated about an axis 11, for instance on the wing 12 of an aircraft bearing the engine 3. A jack 13 disposed in the wing enables the screen to be brought into the discharge plane of the engine escape conduit 2 (FIG. 5a), or to be retracted into the wing (FIG. 5b).

Retraction can be performed by tilting around an axis perpendicular to the axis of the engine, or by an other rotary or translational movements, if necessary combined.

As shown in FIGS. 6a, 6b and 7, the screen is formed by wires 6 articulated by one of their ends to the edge of the conduit 2. The other end of each wire can be retained in the discharge plane of the conduit by a hook 15 disposed, for instance, in a central profiled nucleus 16, as shown in FIG. 6a. A jack 17 also disposed in the nucleus 16 enables the hooks 15 to be disengaged from the ends of the wires which can then be deployed without impeding the flow of gases, as shown in FIGS. 6b and 7.

In the variant illustrated in FIG. 8, the wires 6 are attached by their two ends to a circular ring 7 so that they can be discarded during flight. To this end attachment is performed by means of explosive assembly devices 18 which can be exploded at the correct time by electric conductors. The wires might also be cut through by an electric current of sufficient intensity.

In the variant illustrated in FIGS. 9a and 9b the wires 6 form part of two blinds which can be wound on spindles 20, 21 disposed on either side of the orifice of the conduit 2. The wires are attached at their ends to elements 22, such as chains, which are wound on to the respective spindles.

The spindle 20 is controlled by two lateral cords 23 running over pulleys 24 attached to the spindle 20 and over return pulleys 25, 26 to be wound on to an operating drum 27. The first wire of the corresponding blind is attached to the cords 23 by its ends, as shown in the drawing.

The spindle 21 is controlled by belts 28 running over pulleys 29 attached to the spindle 21 and over return pulleys 30 disposed, alongside the pulleys 25, substantially at the ends of the diameter of the orifice of the conduit 2 where the blinds meet one another. A double connection 31 is provided on each side of the device between the cords 23 and the belts 28 to synchronize the movements of the two blinds in opposite directions when the cords 28 are operated.

The invention can be applied to any fluid escape conduit and is more particularly advantageous for jet engines for aircraft or other vehicles, more particularly high expansion rate engines.

The invention can be particularly advantageously applied to the apparatus disclosed in French Pat. No. 1,164,692 filed in the Applicants' name on Jan. 9, 1957 and its First Certificate of Addition No. 73,803 filed on July 1, 1958.

Clearly, modifications can be made to the embodiments disclosed hereinbefore, inter alia by the substitution of equivalent technical means, without exceeding the scope of the invention.

We claim:

1. Apparatus for attenuating noise caused by the ejection of fluid from a conduit comprising a conduit having a discharge plane through which a jet of fluid is discharged, and an openwork screen disposed in the fluid jet path in the conduit discharge plane, said screen comprising elements articulated at one end to said conduit and attached to hooks at their other end, which hooks are movable for detaching the said other ends of said elements from said hooks.

2. Apparatus for attenuating noise caused by the ejection of fluid from a conduit, comprising a conduit having a discharge plane through which a jet of fluid is discharged, an openwork screen comprising elongated wirelike elements disposed substantially equidistant from one another in the fluid jet path, in said discharge plane, and means for removing said elements from said fluid jet path after a predetermined period of fluid ejection.

3. Apparatus as claimed in claim 2 wherein said screen has an open area which is approximately 80–95 percent of its cross-sectional area.

4. Apparatus as claimed in claim 2 wherein said conduit is secured to the structure of an aircraft, said means comprising a jack mounted onto said structure and connected to said screen for moving the latter into and out of said discharge plane.

5. Apparatus according to claim 2 wherein said screen comprises at least one blind and wherein said retraction means comprises means for drawing the blind across and away from the path of the jet of fluid.

6. Apparatus according to claim 2 wherein said screen comprises a frame and explosive assembly devices for connecting the ends of said elements to said frame, means being provided for firing said devices whereby said elements can be removed from said fluid jet path.

7. Apparatus according to claim 2 for use with a conduit ejecting hot gases wherein said elements comprise a protective sheath adapted to be burnt into said gases and a core made of a material adapted to be destroyed by the said gases after the sheath has been burnt away.

8. Apparatus according to claim 7 for use with the ejection conduit of a jet reaction engine, wherein the sheath is made out of a synthetic resin and the core out of a material of the group comprising carbon and boron.

9. Apparatus according to claim 2 wherein said screen is formed by rectilinear wires whose longitudinal axes are located in said discharge plane.

* * * * *